United States Patent
Neumann

(10) Patent No.: US 8,353,010 B2
(45) Date of Patent: Jan. 8, 2013

(54) METHOD OF ESTABLISHING PROTECTED ELECTRONIC COMMUNICATION BETWEEN VARIOUS ELECTRONIC DEVICES, ESPECIALLY BETWEEN ELECTRONIC DEVICES OF ELECTRONIC SERVICE PROVIDERS AND ELECTRONIC DEVICES OF USERS OF ELECTRONIC SERVICE

(75) Inventor: Libor Neumann, Praha (CZ)

(73) Assignee: ANECT a.s., Brno (CZ)

( * ) Notice: Subject to any disclaimer, the term of this patent is extended or adjusted under 35 U.S.C. 154(b) by 421 days.

(21) Appl. No.: 12/733,754

(22) PCT Filed: Jul. 4, 2008

(86) PCT No.: PCT/CZ2008/000077
§ 371 (c)(1),
(2), (4) Date: Mar. 18, 2010

(87) PCT Pub. No.: WO2009/046684
PCT Pub. Date: Apr. 16, 2009

(65) Prior Publication Data
US 2010/0205661 A1  Aug. 12, 2010

(30) Foreign Application Priority Data
Oct. 12, 2007  (CZ) .................................... 2007-713

(51) Int. Cl.
*H04L 29/06* (2006.01)
(52) U.S. Cl. .......... 726/3; 726/4; 726/5; 726/26; 726/27
(58) Field of Classification Search .................. None
See application file for complete search history.

(56) References Cited

U.S. PATENT DOCUMENTS
6,711,682 B1 * 3/2004 Capps ........................... 713/184
(Continued)

FOREIGN PATENT DOCUMENTS
WO    WO 01/65340    9/2001

OTHER PUBLICATIONS

International Search Report.
Wael Adi et al., "Bio-Inspired Electronic-Mutation with genetic properties for Secured Idenficiation," 2007, Ecsis Symposium on Bio-Inspired, Learning and Intelligent Systems for Security, 2007, BLISS, IEEE, PI, Aug. 1, 2007, pp. 133-136, XP-031127642. (ISR).

(Continued)

*Primary Examiner* — Benjamin Lanier
(74) *Attorney, Agent, or Firm* — Collard & Roe, P.C.

(57) ABSTRACT

A method of establishing protected electronic communication between various electronic devices equips users beforehand with a personal electronic identity gadget bearing no information about the user identity. Only at the first connection of the blank personal gadget to the electronic devices of an arbitrary electronic service provider, and/or to local electronic devices, the personal electronic identity gadget and the electronic devices and/or the local electronic devices mutually generate a verifiable electronic identity, which is stored in the personal electronic identity gadget and in the electronic devices and/or local electronic devices, for the needs of further mutual electronic communication, separately from other identities and without the knowledge of personal data about the user. Consequently only the generated and stored information is utilized for verification of the identity at every subsequent connection of the user to the electronic devices of the given electronic service provider and/or to the local electronic devices.

5 Claims, 2 Drawing Sheets

U.S. PATENT DOCUMENTS

Figure 1:
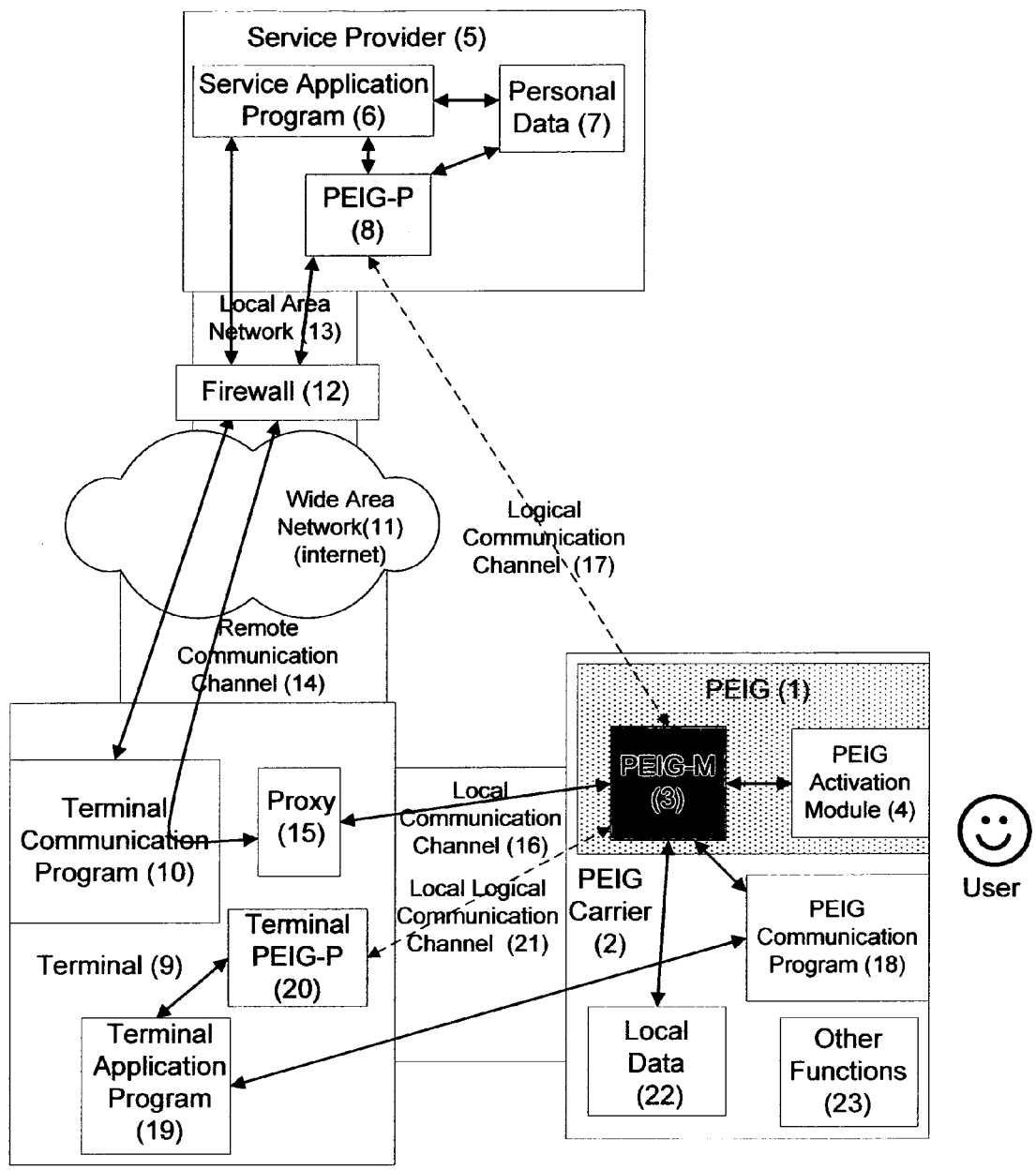

| | | | |
|---|---|---|---|
| 7,165,174 B1 | 1/2007 | Ginter et al. | |
| 7,290,288 B2 * | 10/2007 | Gregg et al. | 726/28 |
| 7,562,382 B2 * | 7/2009 | Hinton et al. | 726/2 |
| 7,596,702 B2 * | 9/2009 | Lawman et al. | 713/193 |
| 7,636,696 B1 * | 12/2009 | Sigler et al. | 705/74 |
| 7,849,312 B2 * | 12/2010 | Maletsky et al. | 713/168 |
| 7,996,888 B2 * | 8/2011 | Asunmaa et al. | 726/9 |
| 2008/0150677 A1 * | 6/2008 | Arakawa | 340/5.2 |

OTHER PUBLICATIONS

Neumann, L., "Anonymous, Liberal and User-Centric Electronic Identity Supports Citizen Privacy Protection in e-Governmant," [Online] Apr. 25, 2008, pp. 1-15, XP-002521386. (ISR) http://www.epma.cz/Docs/EEEGD08/Neumann_ALUCIDvl.pdf.

* cited by examiner

METHOD OF ESTABLISHING PROTECTED ELECTRONIC COMMUNICATION BETWEEN VARIOUS ELECTRONIC DEVICES, ESPECIALLY BETWEEN ELECTRONIC DEVICES OF ELECTRONIC SERVICE PROVIDERS AND ELECTRONIC DEVICES OF USERS OF ELECTRONIC SERVICE

CROSS REFERENCE TO RELATED APPLICATIONS

This application is the National Stage of PCT/CZ2008/000077 filed on Jul. 4, 2008, which claims priority under 35 U.S.C. §119 of Czech Republic Application No. PV 2007-713 filed on Oct. 12, 2007. The international application under PCT article 21(2) was published in English.

TECHNICAL FIELD

The invention concerns the method of establishing protected electronic communication between various electronic devices, especially between electronic devices of electronic service providers and electronic devices of users of electronic service and/or between local electronic devices and electronic devices of users of electronic service.

BACKGROUND ART

Known systems of electronic communication, especially those securing communication between electronic devices of electronic service providers and electronic devices of users of electronic service, require direct manipulation of the user with information used for determination and/or verification of his/her electronic identity by input of identifiers, such as user names, verification of identity with the use of password, input of PIN etc.

It is quite common that, apart from the user and the service provider, third parties enter the system, as well as other subjects participating in creation, verification, usage, invalidation or other manipulations with the electronic identity, e.g. certification and registration authorities, electronic identity providers etc.

The above-mentioned systems utilize part or all information, by which the user verifies his/her electronic identity, for creation or verification of the electronic identity and for other activities directly connected with electronic identity.

The disadvantage of the known systems of electronic communication between electronic devices of electronic service providers is that personal data of user of electronic service and other information regarding the user personality are not separated from his/her electronic identity. Because the identifiers are not anonymous, they contain information from which it is possible, directly or indirectly to detect the user identity, name or part of the name, birth number, or other personal data, from which it is possible to detect or assess, which person uses the identifier, what service of the service provider he/she uses and in what manner, and also, what service of another service provider he/she uses, and in what manner, which means that the user is not adequately protected against unauthorised information collection regarding his/her identity and his/her activities.

Other disadvantages of known systems include complicated operation by the users, the necessity to create and memorize a lot of passwords, PINS or other data necessary for verification of electronic identity, while maintaining their privacy and protecting them against abuse. This frequently leads to situations, when the user forgets such information or discloses it to unauthorised person, and it causes the need to solve such complicated situations. In real operation, these disadvantages are exceptionally troublesome, if the user of electronic service communicates with a vast number of electronic service providers and/or when the electronic service provider communicates with a great number of users of electronic service, especially from distant locations.

Also the existence of third parties and their participation in creation, verification, usage, invalidation or other manipulations with the electronic identity is an item adding complexity both for the users of electronic service and for the electronic service providers, frequently connected with other costs and fees as well.

DISCLOSURE OF INVENTION

The aim of the invention is to eliminate the above-mentioned disadvantages, by a new manner of establishing protected electronic communication between various electronic devices, especially between electronic devices of electronic service providers and electronic devices of users of electronic service and/or between local electronic devices and electronic devices of users of electronic service, based on the fact, that users of electronic service are beforehand equipped with a personal electronic identity gadget bearing no information about the user identity, and only at the first connection of the blank personal gadget to the electronic devices of an arbitrary electronic service provider, and/or to the local electronic devices, the personal electronic identity gadget and the electronic devices of the electronic service provider, and/or the local electronic devices, mutually generate a verifiable electronic identity, which is stored in the personal electronic identity gadget and in the electronic devices of the electronic service provider, and/or in the local electronic devices, for the needs of further mutual electronic communication, separately from other identities and without the knowledge of personal data about the user of electronic service, whereas only the generated and stored information is utilized for verification of the identity at every subsequent connection of the user of electronic service to the electronic devices of the given electronic service provider and/or to the local electronic devices.

According to the invention, it appears as advantageous, that the stored information is utilised for identity verification upon every subsequent connection of user of electronic service to the electronic devices of the provider of electronic service and/or to the local electronic devices prior to every change of the verifiable electronic identity, upon which the identifier is replaced by another identifier without losing the identity and personified context.

According to the invention, it appears to be exceptionally advantageous, that after providing personal data to the electronic devices of the electronic service provider and/or local electronic device, and after the consent of the user of electronic service with its handover to the electronic devices of at least one other electronic service provider and/or local electronic device, a temporary one-shot electronic identity is generated, by the personal electronic identity gadget, together with electronic devices of the participating electronic service providers and/or together with local electronic devices, intended for the realisation of the handover of user personal data between the participating electronic service providers and/or local electronic devices.

From the side of generation of creation of the electronic identity, it further appears as advantageous, according to the invention, that the generation of verifiable electronic identity and identity verification is done symmetrically in such a manner, that by a combination of one part of the identifier generated by the personal electronic identity gadget and the second part of the identifier generated by electronic devices of the electronic service providers or local electronic devices, an identifier is created, which cannot be created and/or verified by either party alone, without the cooperation of the other party, whereas the personal electronic identity gadget verifies the identity on the side of the user with the use of secret information connected with the identity, handed over by electronic devices of the electronic service providers or local electronic devices, and vice versa, the electronic devices of the electronic service providers or local electronic devices verify the identity on the side of the electronic service provider or at the side of the local electronic device with the use of secret information connected with the identity, handed over by the personal electronic identity gadget, and only after successful verification of the identifiers of both parties, the identity is considered as verified.

From the side of personal data protection, it is advantageous, according to the invention, that the execution of asymmetric cryptography with standard key pairs is realised with absence of all data structures containing personal data and in the absence of procedures and activities connected with such personal data.

According to the invention, it is further advantageous for security enhancement, that in case of incorrect or unsuccessful activation of the personal electronic identity gadget a self-destruction mechanism can be triggered, resulting in cancellation of the validity of the identification contained both in the personal electronic identity gadget on the side of the user and in the electronic devices of the electronic service providers and/or local electronic devices on the side of the service provider and/or local electronic devices.

DESCRIPTION OF FIGURES IN DRAWINGS

Further advantages and impacts of the invention are evident from the enclosed figures:

FIG. 1: Presentation of a process of establishing a protected electronic communication between various electronic devices, especially between electronic devices of the electronic service providers and electronic devices of the users of electronic service and/or between local electronic devices and electronic devices of the users of electronic service by means of logical communication channels and a personal electronic identity gadget (PEIG).

Figure 2:
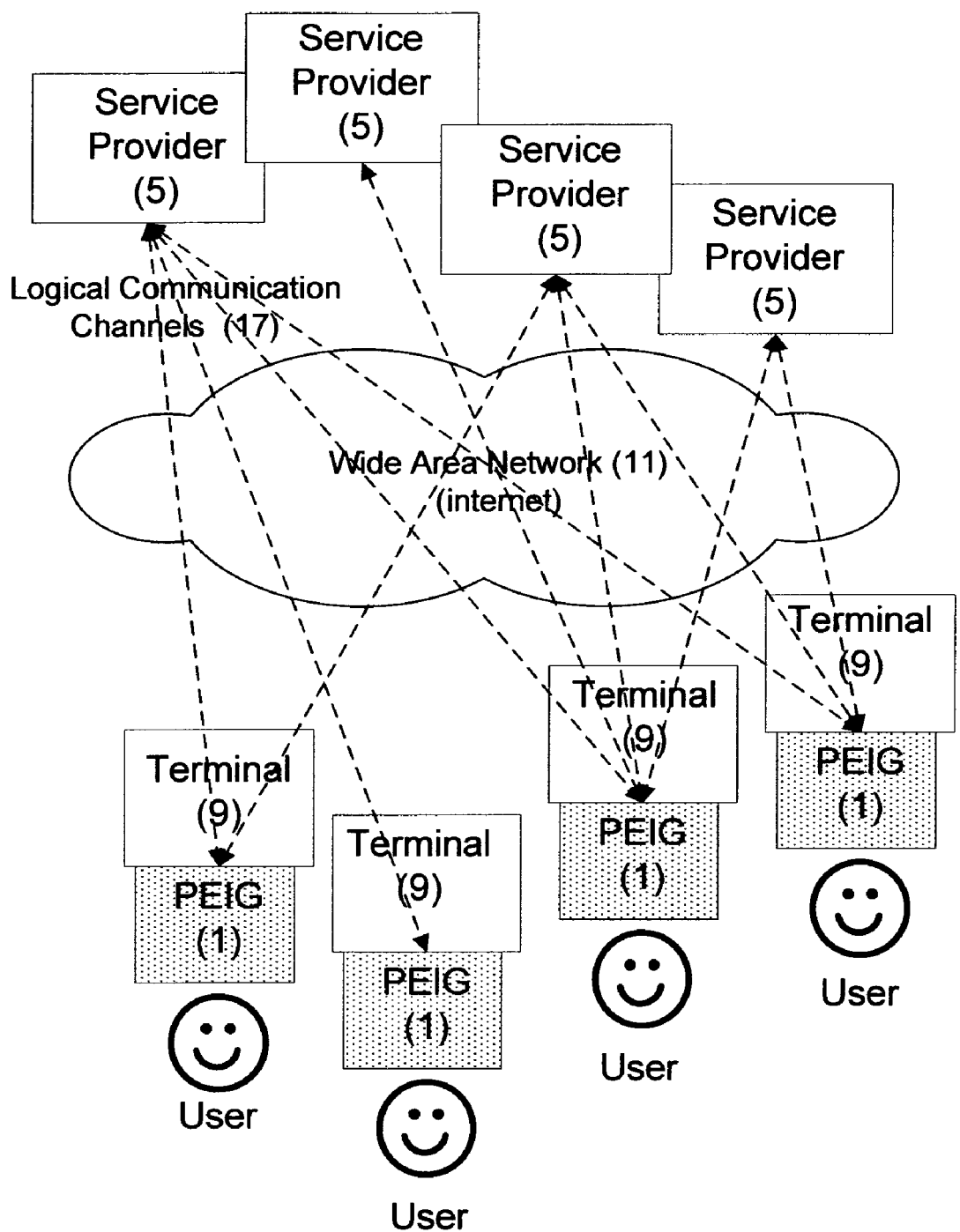

FIG. 2: Demonstration of an example of system chaining with multiple or unlimited number of partners by creation of only the necessary number of logical communication channels between personal electronic identity gadgets PEIG and electronic devices of electronic service providers and/or local electronic devices.

EXAMPLE OF CARRYING OUT THE INVENTION

The method of establishing protected electronic communication according to the invention, between various electronic devices, especially between electronic devices of electronic service providers and electronic devices of users of electronic service, is based on automated special appliance PEIG 1 (Personal Electronic Identity Gadget). The appliance is an automated special electronic appliance or a part of an appliance universally used by its owner-user for all activities connected with electronic identity.

The PEIG 1 appliance is designated for personal use by one person, that means, for preservation and handling of the electronic identity of its owner-user and for provision of all other activities connected with creation, usage, maintenance and cancellation of an electronic identity or identities of a single user.

Electronic appliance performing the PEIG 1 functions, which may perform also other functions, is called the PEIG carrier 2. It is a small, easily portable appliance facilitating its owner-user to carry his/her electronic identity always with him/her. A notable characteristic of the appliance is its extremely easy usage. The ownership and usage of PEIG 1 is voluntary and one person may own and use multiple PEIGs 1.

PEIG 1 activation is separated from electronic identity. Data used for activation of PEIG 1 are not used for electronic identity and vice versa, the data used for electronic identity are not used for PEIG 1 activation.

PEIG 1 alone is indistinguishable from other PEIGs working in the given system. It is produced blank, without any electronic identity and without any information needed for personalised PEIG activation.

The PEIG 1 appliance contains at least two mutually separated parts connected together. These parts are PEIG-M 3 and PEIG Activation Module 4.

PEIG-M 3 module maintains all activities connected with electronic identity on the side of the user.

PEIG Activation Module 4 maintains activation and deactivation of electronic identity device by PEIG owner. PEIG Activation Module 4 communicates with the user in such a manner, as to verify physical identity of the user by a selected method, for example by scanning of fingerprints, eye pupil, password input etc.

Apart from the modules described above, the PEIG Carrier 2 may contain also other modules maintaining the usage of the electronic identity in various situations directly with the use of the PEIG Carrier 2, for example PEIG Communication Program 18.

The PEIG Carrier 2 may contain also Local Data 22, i.e. data that the user carries with him/her together with PEIG 1. The access to Local Data 22 may be governed on the basis of information from PEIG-M 3 i.e. it may be granted only to selected Service Providers 5.

Apart from this, the PEIG Carrier 2 may contain also other modules serving other purposes, designated in FIG. 1 as Other Functions 23.

PEIG 1 communicates with the Service Provider 5. The devices in question are devices designated for electronic service provision. These devices usually contain a number of modules serving different purposes, more or less tightly integrated with the provided service and electronic identity of the user of service. These may be, for example, the Service Application Program 6 and storage place for personal and other data about the users of the service Personal Data 7.

The PEIG-P 8 module maintains all activities connected with creation, usage, maintenance and cancellation of an electronic identity or identities of users of a service or cluster of services, on the side of the Service Provider 5.

The PEIG-P 8 module on the side of the Service Provider 5 communicates logically directly with the PEIG-M 3 module on the side of the user by means of a Logical Communication Channel 17. They mutually exchange, confirm, change, verify and otherwise manipulate information connected with the electronic identity of the user.

The actual physical information exchange is conducted by a number of different modules, services and devices, so that mutual communication is secured while maintaining the necessary links and the necessary level of communication security. As stated below, commonly available and widely used devices are used for this purpose, as well as special devices, some of which are shared also for other purposes and some of which are dedicated to communication connected with electronic identity.

The user usually communicates through a Terminal 9. This is a common device designated for electronic communication with electronic service. A PC personal computer or a self-service public terminal with necessary software, are examples of implementations of such a terminal. The actual communication of the user is maintained by the Terminal Communication Program 10, which communicates with the Service Application Program 6. Terminal 9, Service Providers 5 and other devices and services are used for this. These include especially the devices for data transfer, Wide Area Networks 11, for example the Internet, protective functions of the Firewall 12 and the service of Local Area Network 13. Protective functions of the Firewall 12 may be realised by various methods. It does not have to be the actual functionality of the firewall, other methods of internal network protection of the Service Provider 5 may be used as well, for example a Proxy server.

The Service Application Program 6 at the Service Provider 5 utilises for its activity the information about the electronic identity of the user obtained from PEIG-P 8 and with the use of this information it obtains further data about the user, for example Personal Data 7.

In order for PEIG-P 8 to have the correct and secure information about the user electronic identity at its disposal, it communicates with PEIG-M 3. For this, it utilises the same or similar communication devices as the communication between the Terminal Communication Program 10 and Service Application Program 6, this means, apart from the devices of the Terminal 9 and the Service Provider 5, it uses also the data transfer devices of Wide Area Network 11, for example the Internet, protective functions of the Firewall 12 and the service of Local Area Network 13. Together, these devices are designated as Remote Communication Channel 14. This Remote Communication Channel 14 facilitates bidirectional information transfer connected with electronic identity between the devices of Service Provider 5 and the Terminal Communication Program 10 in such a manner, that they are uniquely tied to the communication of the electronic service provided for the corresponding user.

Communication between PEIG-P 8 and PEIG-M 3 is routed by common devices to the security module Proxy 15, usually with the use of Terminal Communication Program 10. The security function of module Proxy 15 may be maintained also in some other way, for example by a firewall.

The security module Proxy 15 communicates with PEIG-M 3 module with the use of devices of local communication and local communication devices of the Terminal 9 and the PEIG Carrier 2. The local communication devices, i.e. the communication device of the Terminal 9 and of the PEIG Carrier 2 are common devices of local near communication between electronic devices, having suitable technical and security parameters.

Together, these devices form the Local Communication Channel 16, by the use of which direct communication between PEIG-M 3 and Proxy 15 takes place.

The Logical Communication Channel 17, by the use of which the direct communication between PEIG-M 3 and PEIG-P 8 takes place, is created by the Remote Communication Channel 14, Proxy 15, Local Communication Channel 16 and usually also by Terminal Communication Program 10.

Examples of Further Utilisation of the System for Establishing Protected Electronic Communication Between Various Electronic Devices Local Usage PEIG 1 may serve also for securing and servicing of electronic identity during local communication of the user with local electronic devices designated as Terminal 9. In the course of this, Terminal 9 may or may not communicate with the remote Service Provider 5. In the case the user will use PEIG Communication Program 18 located on the PEIG Carrier 2. This PEIG Communication Program 18 will communicate with the Terminal Application Program 19.

PEIG-M 3 will communicate directly with Terminal PEIG-P 20 through Local Communication Channel 16 and internal communication devices of the PEIG Carrier 2 and Terminal 9, forming a Local Logical Communication Channel 21. Terminal PEIG-P 20 hands over the information about the user electronic identity to the Terminal Application Program 19, which hands it over to other modules of the Terminal 9.

Common Usage

Electronic identification devices are designated for universal usage by a large number of users and Service Providers 5. One PEIG 1 may therefore be used by one user-owner for electronic identification with multiple Service Providers 5 and one Service Provider 5 may utilize multiple different PEIGs 1 owned by different users for their identification.

Functionality of individual electronic identification devices both on the side of the PEIG 1 user and on the side of Service Provider 5 is adapted to such multiple usage, in principle with an unlimited number of partners. Number of partners is limited only by parameters of the utilised equipment, for example by the memory capacity.

When communicating with a larger number of PEIG 1 users and Service Providers 5, the necessary number of Logical Communication Channels 17 (FIG. 2) is created, securing, in cooperation with the functionality of electronic identity devices PEIG-M 3 and PEIG-P 8, unique relations between the users and provided service. This holds similarly also for local usage.

Electronic identity devices PEIG-M 3 and PEIG-P 8 may be chained, so that PEIG-P 8 is used as a PEIG Activation Module 4 of the chained PEIG 1. One PEIG 1 can therefore activate another PEIG 1. It is also possible to chain different types of electronic identity devices. Various situations of local communication, eventually distant communication, may be solved by chaining, for example solutions of cooperation with other systems for securing backward compatibility or coverage or power supply in wireless communication.

Function of the System of Establishing Protected Electronic Communication and Cooperation Between PEIG-M and PEIG-P The following text describes mutual cooperation of PEIG-M 3 a PEIG-P 8 or Terminal PEIG-P 20 during work with electronic identity. In further text, the term PEIG-P 8 denotes both PEIG-P 8 of the Service Provider 5, and Terminal PEIG-P 20. Their cooperation with PEIG-M 3 is identical.

At the time of production, neither PEIG-M 3, nor PEIG-P 8 contain any information about electronic identity. They are blank.

The user-owner activates PEIG 1 usually after prior setting of the PEIG Activation Module 4. During the first access of the user to the provided service, the electronic identity of the user is generated for the corresponding service by mutual cooperation of PEIG-M 3 and PEIG-P 8. The appropriate information is stored inside PEIG-M 3 and PEIG-P 8.

At subsequent access attempt of the user to the provided service, the information stored inside PEIG-M 3 and PEIG-P 8 is used to distinguish the user of service and to verify the electronic identity of the user.

In case of need, information about the user, e.g. Personal Data 7 or access rights, is securely linked to the electronic identity of the user in such a manner, that the resources of the Service Provider 5, eventually of the Terminal 9, have the corresponding information directly at their disposal in the context of the Service Application Program 6, eventually of the Terminal Application Program 19.

During usage of the electronic service, another electronic identity may be added, identifiers may be changed, electronic identity may be cancelled or other changes may occur, based on the cooperation of PEIG-M 3 and PEIG-P 8. The access rights or other user attributes of the service may be set-up in relation with the electronic identity.

PEIG-M 3 and PEIG-P 8 cooperation may support also other activities connected with electronic identity. This may incorporate support of secure information exchange, for example exchange of personal data between various service providers while maintaining confidentiality of the electronic identity of the user or special activities connected with support of transactions between the user and several Service Providers 5, for example electronic payments.

For mutual cooperation of PEIG-M 3 and PEIG-P 8, the following procedures and devices are used:

PEIG 1 (Personal Electronic Identity Gadget)—The appliance is an automated special electronic appliance or a part of an appliance universally used by its owner-user for all activities connected with electronic identity. The appliance is designated for personal usage by one person. This is a small portable appliance enabling the user to carry his electronic identity always with him. A notable characteristic of the appliance is its extremely easy usage.

The ownership-usage of PEIG 1 is voluntary and one person may own and use multiple PEIGs 1.

PEIG 1 activation is separated from electronic identity. Data used for activation of PEIG 1 are not used for electronic identity and vice versa, the data used for electronic identity are not used for PEIG 1 activation.

PEIG 1 alone is indistinguishable from other PEIGs 1. It is produced blank, without any electronic identity and without information needed for PEIG 1 personified activation.

Independent, anonymous and time-variable identifier—PEIG-M 3 and PEIG-P 8 use identifiers for differentiation of users.

These identifiers are independent, that means, that for one user, one PEIG-M 3 uses different identifiers for different Service Providers 5. Even if one Service Provider 5 knows the identifier of the user only for its service, it cannot determine, if the user in question uses services of another Service Provider 5 as well, nor can it determine, which service and in what manner the user uses them. By this, the user is protected from unauthorised information collection about his/her behaviour.

These identifiers are anonymous, which means that the identifier does not contain any information, with the use of which it is possible to determine the identity of the user, whether directly or indirectly. It does not contain the name, not even part of the name, neither birth number nor any other data by the use of which it is possible to determine or assess, which person uses the identifier.

These identifiers are time-variable, which means that the identifier is valid only for a limited period of time. Before expiry of the validity period, the identifier may be replaced by another identifier without loss of identity and personified context.

Symmetrical identity—creation of the identifier and verification of the identity are symmetrical. PEIG-M 3 and PEIG-P 8 activities are balanced. Neither party has dominant position. Neither party can create or verify identity without cooperation of the opposite party.

PEIG-M 3 creates its part of the identifier and PEIG-P 8 also creates its part of the identifier. The identifier originates by combining both parts.

PEIG-P 8 verifies identity on the side of the user using secret information connected with the identity handed over by PEIG-M 3 and vice versa, PEIG-M 3 verifies the identity on the side of the Service Provider 5 using secret information connected with the identity handed over by PEIG-P 8. Only after successful verification on both sides the identity is considered as verified.

One-time shared identifier—serves for trustworthy information connection of an individual transaction between multiple Service Providers 5, without breach of the independence of the identifiers used by one PEIG 1 owner-user with multiple Service Providers 5.

The identifier is generated only for the purpose of an individual transaction of the secured information transfer between the Service Providers 5, and it is connected in the trustworthy manner with information that should be handed over as part of the transaction and together with identifiers used by the individual Service Providers 5, that way that every Service Provider 5 has only the information that belong to it at its disposal, and at the same time, the Service Provider 5 has the trustworthy guaranteed_fact that information being handed over concern the appropriate PEIG 1 user-owner.

Separation of personal information—all personal information and other information regarding the personality of the user is separated from the electronic identity. Such personal information is not contained in the communication between PEIG-M 3 and PEIG-P 8, neither in the contents of PEIG 1. Personal information may be stored separately in the system of the Service Provider 5 and it may be credibly linked with the electronic identity. Service Provider 5 has at its disposal only such personal information, which was handed over to it by the user, or such personal data, which were handed over to it by another Service Provider 5 based on the consent of the user. At the same time, the Service Provider 5 may protect effectively the personal data of the users in its internal systems, because such data and their parts or derived data are not used throughout determination and verification of electronic identity.

Asymmetric cryptography without personal data—technology of asymmetric cryptography is used without any personal data Standard key pairs, public and private ones, are used, as in common PKI (Public Key Infrastructure), however, no data structures containing personal data, e.g. certificates, are used. Also, no procedures and activities connected with such personal data are used, e.g. certificate policies, verification of physical identity etc.

Identity Cluster—one Service Provider 5 may couple several of its technical services with one user identity. All services so coupled will use the same user identifier. Service Provider 5 may use such coupling for various purposes, for example to credibly couple personal data about the user secured by one technical service with service provided to the user by another technical service.

Such coupling will be managed and controlled by a security management system of that Service Provider 5.

Self-destruction mechanism—in case of incorrect or unsuccessful PEIG 1 activation by unauthorised person, a self-destruction mechanism may be automatically triggered, which, instead of granting access to the service for the unauthorised person, cancels the validity of the identification, both contained in PEIG-M 3 on the side of the user and in PEIG-P 8 on the side of the Service Provider 5. Identifiers and functional capabilities of PEIG-M 3 and PEIG-P 8 are ready for such a destruction, either on the basis of incorrect activation of PEIG-M 3 and/or on the basis of limited time validity of the identifier. The destruction of identifiers on the basis of limited validity takes places also in case when PEIG 1 is not used for a prolonged time period, for example upon its loss.

Security levels—level of safeguarding of electronic identity is described by means of technologically neutral and independently verifiable security levels. Every user and every Service Provider 5 may easily find out, to which security level a given product corresponds and thus, what security parameters it fulfils or what security demands it complies to.

Separation of network communication—individual modules of electronic identity PEIG-M 3 and PEIG-P 8 do not remotely communicate directly. The actual communication over Wide Area Network 11 is separated by specialised network security elements, both on the side of the Service Provider 5 (Firewall 12) and on the side of the user (Proxy 11). PEIG 1 may physically communicate only to a very small distance, this being done with the use of other communication devices (Local Communication Channel 16) than those used for communication with remote Service Provider 5 (Remote Communication Channel 14).

INDUSTRIAL USABILITY

The communication between PEIG-M 3 a PEIG-P 8, eventually Terminal PEIG-P 20 at the level of Logical Communication Channel 17, eventually Local Logical Communication Channel 21 is described by necessary rules facilitating standardization and mutual cooperation of products of various producers. The method by which the rules are created and described facilitates usage of common devices for realization of the Logical Communication Channel 17 and therefore also utilization of existing technologies and devices for the purposes of electronic identity.

Corresponding communication channels, Remote Communication Channel 14 and Local Communication Channel 16 are also described as part of the description of electronic identity interface, in several variants. Logical Communication Channel 17 eventually Local Logical Communication Channel 21 may therefore be realised with the use of different variants of communication channels. In future, other, presently not known or not used communication channels may be utilised.

As part of extensible functionality, the individual modules of electronic identity PEIG-M 3 and PEIG-P 8 are constructed as virtual specialised computers with extensible instruction set. This facilitates future enhancements by new necessary activities connected with new requirements or other areas of usage, for example new functionality for electronic payments support.

The invention claimed is:

1. A method of establishing protected electronic communication between various electronic devices, especially between electronic devices of electronic service providers and electronic devices of users of electronic service and/or between local electronic devices and electronic devices of users of electronic service, wherein users of electronic service are beforehand equipped with a personal electronic identity gadget bearing no information about the user identity, and only at the first connection of the personal electronic identity gadget to the electronic devices of an arbitrary electronic service provider, and/or to the local electronic devices, the personal electronic identity gadget and the electronic devices of the electronic service provider, and/or the local electronic devices mutually generate a verifiable electronic identity, which is stored in the personal electronic identity gadget and in the electronic devices of the electronic service provider, and/or in the local electronic devices, for the needs of further mutual electronic communication, separately from other identities and without the knowledge of personal data about the user of electronic service, whereas consequently only the generated and stored information is utilized for verification of the identity at every subsequent connection of the user of electronic service to the electronic devices of the given electronic service provider and/or to the local electronic devices, and wherein the generation of verifiable electronic identity and identity verification is done symmetrically in such a manner, that by a combination of one part of the identifier generated by the personal electronic identity gadget and the second part of the identifier generated by electronic devices of the electronic service providers or local electronic devices, an identifier is created, which cannot be created and/or verified by either party alone, without the cooperation of the opposite party, whereas the personal electronic identity gadget verifies the identity on the side of the user of electronic service with the use of secret information connected with the identity, handed over by electronic devices of the electronic service providers or local electronic devices, and vice versa, the electronic devices of the electronic service providers or local electronic devices verify the identity on the side of the electronic service provider or at the side of the local electronic device with the use of secret information connected with the identity, handed over by the personal electronic identity gadget, and only after successful verification of the identifiers of both parties, the identity is considered as verified.

2. The method according to claim 1, wherein the stored information is utilized for identity verification upon every subsequent connection of the user of electronic service to the electronic devices of the electronic service provider and/or to the local electronic devices prior to every change of the verifiable electronic identity, upon which the identifier is replaced by another identifier without losing the identity and personified context.

3. The method according to claim 1, wherein after providing personal data to the electronic devices of the electronic service provider and/or local electronic device, and after the consent of the user of electronic service with its handover to the electronic devices of at least one other electronic service provider and/or local electronic device, a temporary one-shot electronic identity is generated, by the personal electronic identity gadget together with electronic devices of the participating electronic service providers and/or together with local electronic devices, intended for the realization of the handover of user personal data between the participating electronic service providers and/or local electronic devices.

4. The method according to claim 1, wherein the execution of asymmetric cryptography with standard key pairs is realized with absence of all data structures containing personal data and in the absence of procedures and activities connected with such personal data.

5. The method according to claim 1, wherein in case of incorrect or unsuccessful activation of the personal electronic identity gadget, a self-destruction mechanism can be triggered, resulting in cancellation of the validity of the identification contained both in the personal electronic identity gadget on the side of the user of electronic service and in the electronic devices of the electronic service providers and/or local electronic devices on the side of the electronic service provider and/or local electronic devices.

* * * * *